(12) United States Patent
Holness et al.

(10) Patent No.: US 8,509,061 B2
(45) Date of Patent: Aug. 13, 2013

(54) SYSTEMS AND METHODS FOR SCALING PERFORMANCE OF ETHERNET RING PROTECTION PROTOCOL

(75) Inventors: Marc Holness, Nepean (CA); Jie Hu, Santa Rosa, CA (US)

(73) Assignee: Ciena Corporation, Hanover, MD (US)

(*) Notice: Subject to any disclaimer, the term of this patent is extended or adjusted under 35 U.S.C. 154(b) by 267 days.

(21) Appl. No.: 13/070,098

(22) Filed: Mar. 23, 2011

(65) Prior Publication Data
US 2012/0243405 A1    Sep. 27, 2012

(51) Int. Cl.
*H04L 12/56* (2006.01)
*H04L 12/24* (2006.01)

(52) U.S. Cl.
USPC ............................ 370/222; 370/225; 370/404

(58) Field of Classification Search
USPC .................. 370/225, 400, 222, 223, 224, 404
See application file for complete search history.

(56) References Cited

U.S. PATENT DOCUMENTS

| | | | |
|---|---|---|---|
| 7,590,054 B1 | 9/2009 | Holness et al. | |
| 7,738,388 B2 | 6/2010 | Cheung et al. | |
| 8,031,590 B2* | 10/2011 | Long et al. | 370/225 |
| 2002/0010793 A1* | 1/2002 | Noll et al. | 709/240 |
| 2005/0099949 A1 | 5/2005 | Mohan et al. | |
| 2005/0099951 A1 | 5/2005 | Mohan et al. | |
| 2005/0099952 A1 | 5/2005 | Mohan et al. | |
| 2005/0099954 A1 | 5/2005 | Mohan et al. | |
| 2005/0099955 A1 | 5/2005 | Mohan et al. | |
| 2006/0031482 A1 | 2/2006 | Mohan et al. | |
| 2007/0268913 A1* | 11/2007 | Denecheau et al. | 370/397 |
| 2008/0080522 A1* | 4/2008 | Denecheau et al. | 370/400 |
| 2008/0095047 A1 | 4/2008 | Skalecki et al. | |
| 2008/0259920 A1* | 10/2008 | Cheng et al. | 370/390 |
| 2009/0168647 A1 | 7/2009 | Holness et al. | |
| 2009/0168671 A1 | 7/2009 | Holness et al. | |
| 2009/0175166 A1* | 7/2009 | Long et al. | 370/225 |
| 2009/0196172 A1* | 8/2009 | Long | 370/225 |
| 2009/0316571 A1* | 12/2009 | Rose | 370/218 |
| 2010/0110881 A1* | 5/2010 | Ryoo et al. | 370/225 |
| 2010/0165883 A1* | 7/2010 | Holness et al. | 370/255 |
| 2010/0238813 A1 | 9/2010 | Allan et al. | |
| 2010/0260196 A1 | 10/2010 | Holness et al. | |
| 2010/0260197 A1 | 10/2010 | Martin et al. | |
| 2010/0284413 A1 | 11/2010 | Abdullah et al. | |
| 2010/0287405 A1 | 11/2010 | Soon | |
| 2010/0309821 A1 | 12/2010 | Sergeev | |
| 2011/0007628 A1 | 1/2011 | Tochio | |
| 2011/0019536 A1* | 1/2011 | Kim et al. | 370/223 |

(Continued)

*Primary Examiner* — Brian D Nguyen
(74) *Attorney, Agent, or Firm* — Clements Bernard PLLC; Christopher L. Bernard; Lawrence A. Baratta, Jr.

(57) ABSTRACT

The present disclosure provides systems and methods for scaling performance of Ethernet Ring Protection Protocol. Specifically, the systems and methods may apply to G.8032 and may provide protection switching control plane performance scaling benefits. In an exemplary embodiment, the present invention summarizes the per "virtual" ring control plane protocol into a single logical ring control plane protocol. Advantageously, the present invention transforms the G.8032 protocol from a per-virtual ring protocol to a per-logical ring control protocol. The mechanism/methodology that is used is to include minimal per-virtual ring instance information in to the Ring Automated Protection Switching (R-APS) (control) frames. Additionally, the present invention cleanly decouples the placement of the R-APS (control) channel block location on the ring from that of the virtual channel data blocks. Current G.8032 specifications tightly couple the location of each R-APS (control) channel block and the virtual channel block that it is managing.

17 Claims, 18 Drawing Sheets

(56) References Cited

U.S. PATENT DOCUMENTS

| | | |
|---|---|---|
| 2011/0019538 A1 | 1/2011 | Ryoo et al. |
| 2011/0238813 A1* | 9/2011 | Massa et al. ............... 709/223 |
| 2012/0092985 A1* | 4/2012 | Caird et al. ............... 370/225 |

* cited by examiner

SYSTEMS AND METHODS FOR SCALING PERFORMANCE OF ETHERNET RING PROTECTION PROTOCOL

FIELD OF THE INVENTION

The present invention relates generally to communication networks. More particularly, the present invention relates to systems and methods for scaling performance of Ethernet Ring Protection Protocol, G.8032, using a plurality of Virtual Rings (VRings) sharing a single Ring Automated Protection Switching (R-APS) channel.

BACKGROUND OF THE INVENTION

The Ethernet Ring Protection (ERP) protocol is an industry standard and is specified within International Telecommunication Union ITU SG15 Q9, under G.8032 "Ethernet ring protection switching" (G.8032v1-June 2008, and G.8032v2-July 2010). The ERP G.8032 protocol allows multiple "virtual" rings to be present on network elements (i.e., ring nodes) that form a closed loop (i.e., a logical ring). Each virtual ring (associated with the logical ring) has independent control frames (i.e., control planes) that need to be transmitted to manage the protection switching function of the "virtual" ring. Consequently, when the association between "virtual" rings to logical rings gets large (e.g., greater than two), there is considerable processing strain/stress placed on the process (e.g., software) within each ring node, since it is effectively supporting a separate control plane for each virtual ring. Disadvantageously, this additional and excess processing adversely impacts the protection switching time for traffic it is servicing. As G.8032 continues to proliferate with increased deployments within networks, the scaling problem described herein adversely impacts such deployments.

BRIEF SUMMARY OF THE INVENTION

In an exemplary embodiment, a network includes a plurality of interconnect network elements operating in a ring, N virtual rings over the ring, N greater than or equal to one, each of the N rings operating Ethernet Ring Protection thereon, and a single management channel over the ring, wherein the single management channel configured to provide messages for the Ethernet Ring Protection on the N virtual rings. The single management channel may include a Ring Automated Protection Switching (R-APS) channel. The network may further include a virtual ring instance indicator disposed within messages over the R-APS channel, wherein the virtual ring instance indicator denotes which of the N virtual rings is associated with the messages. Optionally, the virtual ring instance indicator is located within an Ethernet Operations, Administration, and Maintenance (OAM) Protocol Data Unit (PDU) message over the R-APS channel. Also, the virtual ring instance indicator may be located within a reserved section of R-APS specific information in the Ethernet OAM PDU message over the R-APS channel. Upon reception of a message over the R-APS channel, each of the plurality of interconnect network elements may be configured to process the message based on the virtual ring instance indicator. The network may further include N service data channel blocks with each of the N service channel blocks associated with one of the N virtual rings and with each of the N service channel blocks at one of the plurality of interconnect network elements, and a management channel block at one of the plurality of interconnected network elements, wherein each of plurality of interconnect network elements with one of the N service channel blocks is configured to include virtual ring instance indicator information in messages on the single management channel. Optionally, at least one of the N service channel blocks is at a different network element from the management channel block.

Under normal operating conditions, the network element including the management channel block is configured to source messages on the single management channel, and the network elements with the N service data channel blocks are configured to include the virtual ring instance indicator information in the sourced messages. Under a fault condition between two of the network elements, the two of the network elements are configured to install the N service channel blocks and the management channel block adjacent to the fault condition, and transmit fault indication messages on the single management channel. Upon receipt of the fault indication messages, each of the network elements is configured to flush a forwarding database, remove any previously installed of the N service data channel blocks, and remove any previously installed of the management channel block. Upon recovery of the fault condition between two of the network elements, the two of the network elements are configured to implement a guard timer, and transmit recovery indication messages on the single management channel. The fault indication messages and the recovery indication messages may include the virtual ring instance indicator information for each of the N virtual rings. Upon receipt of the recovery indication messages, each of the network elements is configured to implement a wait to restore timer, and reinstall the N service data channel blocks and the management channel block as previously configured prior to the fault condition at expiry of the wait to restore timer. Each of the ring and the plurality of virtual rings have no Virtual Local Area Network Identifications (VLAN IDs) in common.

In another exemplary embodiment, a network element includes two or more Ethernet ports configured in a physical ring with a plurality of other network elements, a forwarding database for the two or more Ethernet ports, a controller communicatively coupled to the two or more Ethernet ports and the forwarding database, N virtual rings operating Ethernet Ring Protection on the two or more Ethernet ports, N greater than or equal to one, and a single Ring Automated Protection Switching (R-APS) channel on the two or more Ethernet ports, the single R-APS channel being shared by each of the N virtual rings. The network element may further include an algorithm associated with the R-APS channel to differentiate messages on the R-APS channel based on the N virtual rings.

In yet another exemplary embodiment, a method includes operating a plurality of network elements in a physical ring, provisioning one or more virtual rings on the physical ring with the one or more virtual rings utilizing Ethernet Ring Protection, and provisioning a single management channel on the physical ring, the single management channel including an algorithm to differentiate messages based on the one or more virtual rings. The method may further include installing a service data channel block for each of the one or more virtual rings at one or more of the plurality of network elements, installing a management channel block for the single management channel at one of the plurality of network elements, at the network element with the management channel block, sourcing management messages on the single management channel, and, at each of the plurality of network elements with service data channel blocks, updating based on the algorithm to differentiate management messages based on the one or more virtual rings. The method may further include, under a fault condition between two of the network elements, installing a service data channel block for each of the one or more virtual rings and the management channel block adjacent to the fault condition, transmitting fault indication messages on the single management channel with the algorithm configured such that each of the network elements processes the fault indication messages, upon reception of the fault indication messages on the single management channel, flushing a forwarding database and removing any previously installed service data channel blocks and the management channel block, upon recovery of the fault condition between two of the network elements, implementing a guard timer and transmitting recovery indication messages on the single management channel, and, upon receipt of the recovery indication messages, implementing a wait to restore timer and reinstalling any previously installed service data channel blocks and the management channel block as previously configured prior to the fault condition at expiry of the wait to restore timer.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for scaling performance of Ethernet Ring Protection Protocol. Specifically, the systems and methods may apply to G.8032 and may provide protection switching control plane performance scaling benefits. In an exemplary embodiment, the present invention summarizes the per "virtual" ring control plane protocol into a single logical ring control plane protocol. Keeping in mind that the association between virtual rings to logical rings is many-to-one, ring nodes now only need to participate in a single logical ring protocol session (which may support many virtual rings), instead of many virtual ring protocol sessions. The associated decrease in processing at the ring nodes allows G.8032 to scale supporting more virtual rings, while retaining/maintaining the rapid sub-50 ms protection switching times. Advantageously, the present invention transforms the G.8032 protocol from a per-virtual ring protocol to a per-logical ring control protocol. The mechanism/methodology that is used is to include minimal per-virtual ring instance information in to the Ring Automated Protection Switching (R-APS) (control) frames. Additionally, the present invention cleanly decouples the placement of the R-APS (control) channel block location on the ring from that of the virtual channel data blocks. Current G.8032 specifications tightly couple the location of each R-APS (control) channel block and the virtual channel block that it is managing.

Figure 1:
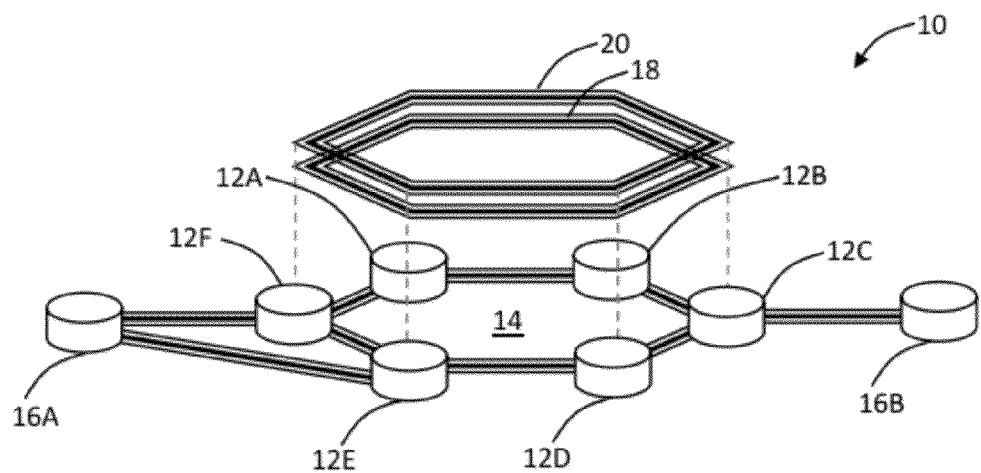
FIG. 1 is a network diagram of network elements in a ring providing Ethernet Ring Protection.

Referring to FIG. 1, in an exemplary embodiment, a network 10 is illustrated of network elements 12A-12F (collectively referred to herein as network elements 12) in a ring 14 providing Ethernet Ring Protection. Also, the network 10 may include network elements 16A, 16B interconnected via the ring 14. The network elements 12, 16A, 16B may include optical switches, optical cross-connects, SONET/SDH devices with layer two traffic, Optical Transport Network (OTN) switches with layer two traffic, Ethernet switches, routers, or any other device commonly known to forward data packets in a network. The network elements 12 are physically configured in a ring topology and the ring 14 is a logical construct that forms a closed loop over the physical network infrastructure. The network elements 12 may utilize G.8032 Ethernet Ring Protection over the ring 14 to provide rapid protection switching below 50 ms. Advantageously using G.8032, the ring 14 and the network elements 12 may be client and server layer agnostic while using existing (and commodity) IEEE 802.1 (bridging) and IEEE 802.3 (MAC) hardware. Connections between adjacent network elements 12 in the ring 14 (i.e., the ring spans) are assumed to be bi-directional, and may be a link, a link aggregation group, or a subnet (e.g., Multiprotocol Label Switching (MPLS), Provider Backbone Bridge Traffic Engineering (PBB-TE), SONET/SDH, OTN, etc.). Also, the ring spans associated with the ring 14 need not be the same bandwidth nor server layer technology. In Ethernet Ring Protection, a "virtual ring" (VRing) is associated with the ring 14 and each VRing includes two channels 18, 20—an R-APS channel 18 used for transport of ring control Protocol Data Units (PDUs) and a service data channel 20 used for transport of client data traffic.

Figure 2:
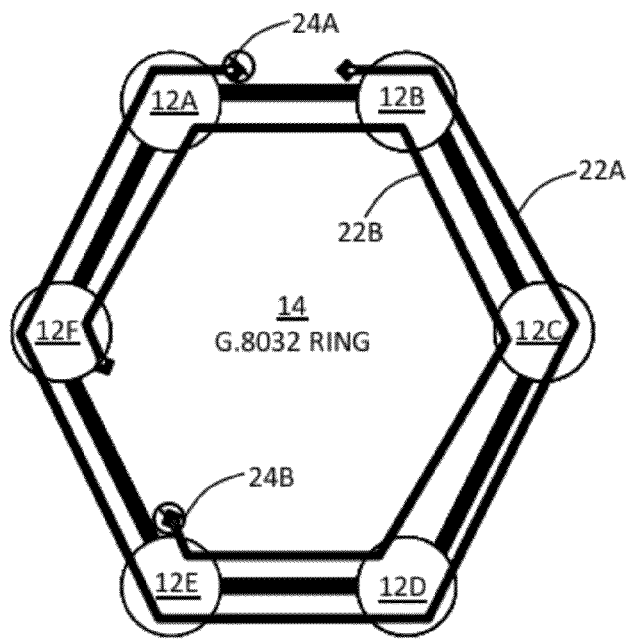
FIG. 2 is a network diagram of the ring of FIG. 1 with two Virtual Rings (VRings) provisioned thereon.

Referring to FIG. 2, in an exemplary embodiment, the ring 14 is illustrated with two VRings 22A, 22B provisioned thereon. Each of the VRings 22A, 22B has a service data channel 20 providing client traffic flows over the ring 14 that share a common provisioned channel block. Also, each client micro traffic flow may have a Virtual Local Area Network (VLAN) associated with it. Also, the multiple VRings 22A, 22B on a given Ring cannot have an overlapping VLAN Identification (VID) space. Each of the VRings 22A, 22B also includes a channel block 24A, 24B (collectively referred to herein as a channel block 24) that prevents VLAN tagged traffic from being relayed/forwarded between [ring or client] ports. Thus, each of the VRings 22A, 22B includes an R-APS channel 18 and a service data channel 20. Each channel 18, 20 needs at least a single channel blocking point on the ring 14, i.e. the channel block 24A, 24B. Using Ethernet Ring Protection, there is a central node called the Ring Protection Link (RPL) owner node which blocks, using the channel block 24, one of the ports, known as the RPL port, to ensure that no loop forms for the Ethernet traffic. Ring Automated Protection Switching (R-APS) messages are used to coordinate the activities of switching the RPL link on or off. Ethernet Shared Protection Ring (E-SPRing) is one instantiation, i.e. one embodiment, of the ERP standard.

Figure 3:
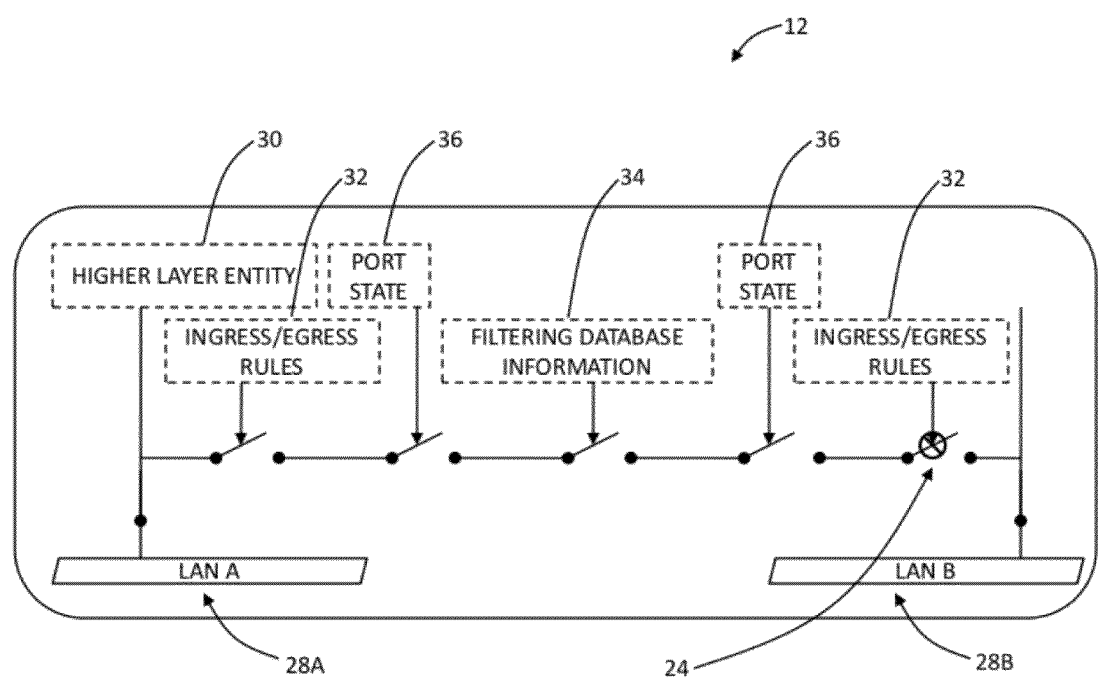
FIG. 3 is a functional block diagram of an exemplary channel block in a network element.

Referring to FIG. 3, in an exemplary embodiment, a functional block diagram illustrates an exemplary channel block 24 in the network element 12. The network element 12 is illustrated with two exemplary ports 28A, 28B (referred to a LAN A and LAN B). The network element 12 may include higher level entities 30, ingress/egress rules 32, port state 34, and a filtering database information 36. The channel block 24 function prevents traffic from being forwarded by the receive ring port. However, it does not prevent traffic from being received by the higher level entities 30 (e.g., G.8032 Engine) on the network element 12. In an exemplary embodiment, the channel block 24 may be realized by ingress/egress rules 34 placed on a [virtual] ring port 28. The following Channel block rules should be applied such that each of the channels 18, 20 must have at least a [single] channel block 24 installed (at all times) and the location of the "provisioned" channel block 24 (associated with the Ring Protection Link) is [currently] operator determined.

Figure 4:
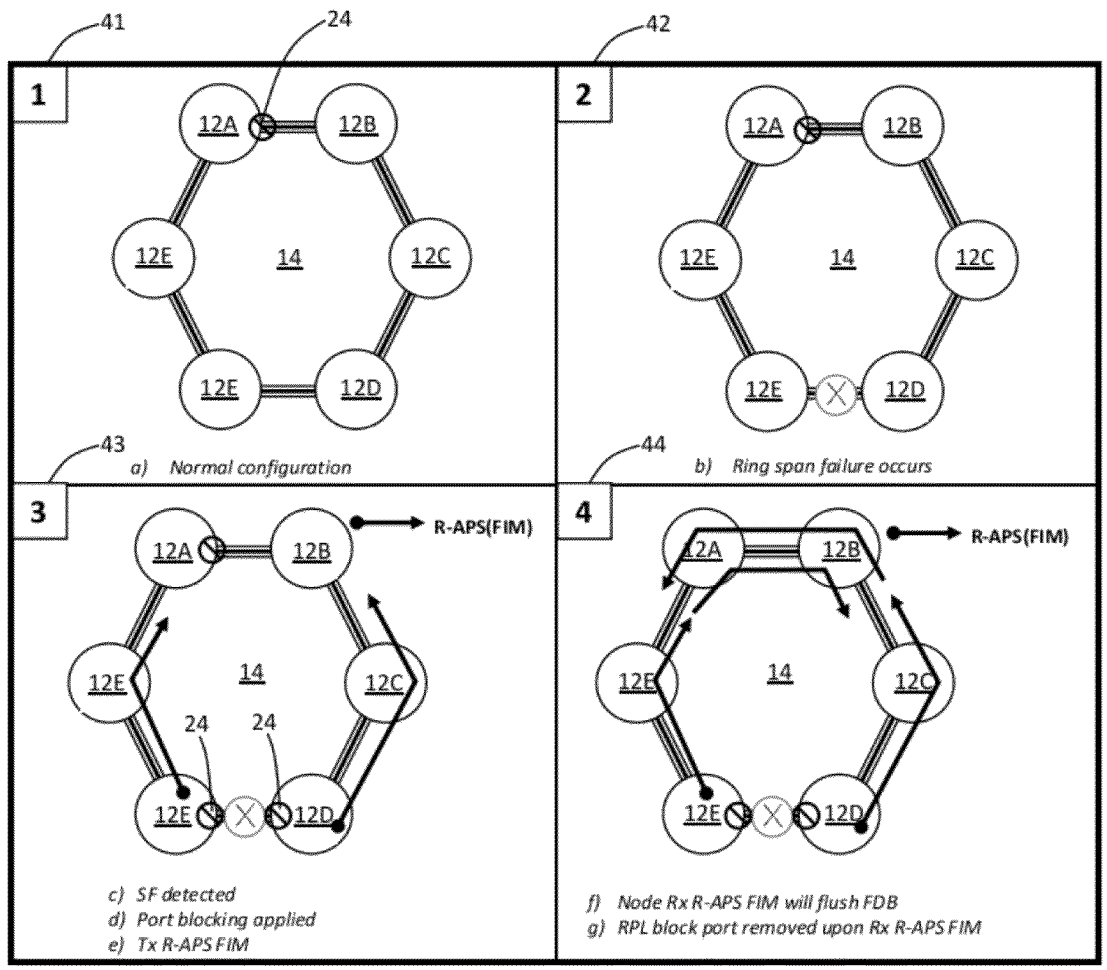
FIG. 4 is a sequence of network diagrams of the ring showing a failure sequence using G.8032 Ethernet Ring Protection on the network elements.

Referring to FIG. 4, in an exemplary embodiment, the ring 14 is illustrated showing a failure sequence using G.8032 Ethernet Ring Protection on the network elements 12. At a first point 41 in FIG. 4, the ring 14 is operating under a normal configuration, i.e. no failures. In this example, the channel block 24 is at the network element 12A facing the network element 12B. At a point 42, a failure occurs on a ring span between the network elements 12E, 12D. At a point 43, a signal failure (SF) is detected on the ring, port blocking is applied at the network elements 12E, 12D via channel blocks 24, and R-APS Failure Indication Messages (FIM) are transmitted. At a point 44, each of the network elements 12 will receive the R-APS FIM and flush their current Forwarding Database (FDB) and the channel block 24 will be removed at the network element 12A upon receipt of the R-APS FIM. The FDB includes information which contains the routing configuration from the point of view of the current network element. Under G.8032, general protocol guidelines used to support protection switching within 50 ms are 1) Time for a R-APS message to circulate an entire ring (i.e., ring circumference and nodal transit delays) should be $\leq$10 ms, 2) Time taken to install channel blocks should be $\leq$15 ms, 3) Time taken to cleanse stale entries found in the FDB associated with Ring should be $\leq$10 ms, and 4) Time taken to remove channel blocks should be $\leq$15 ms.

Figure 5:
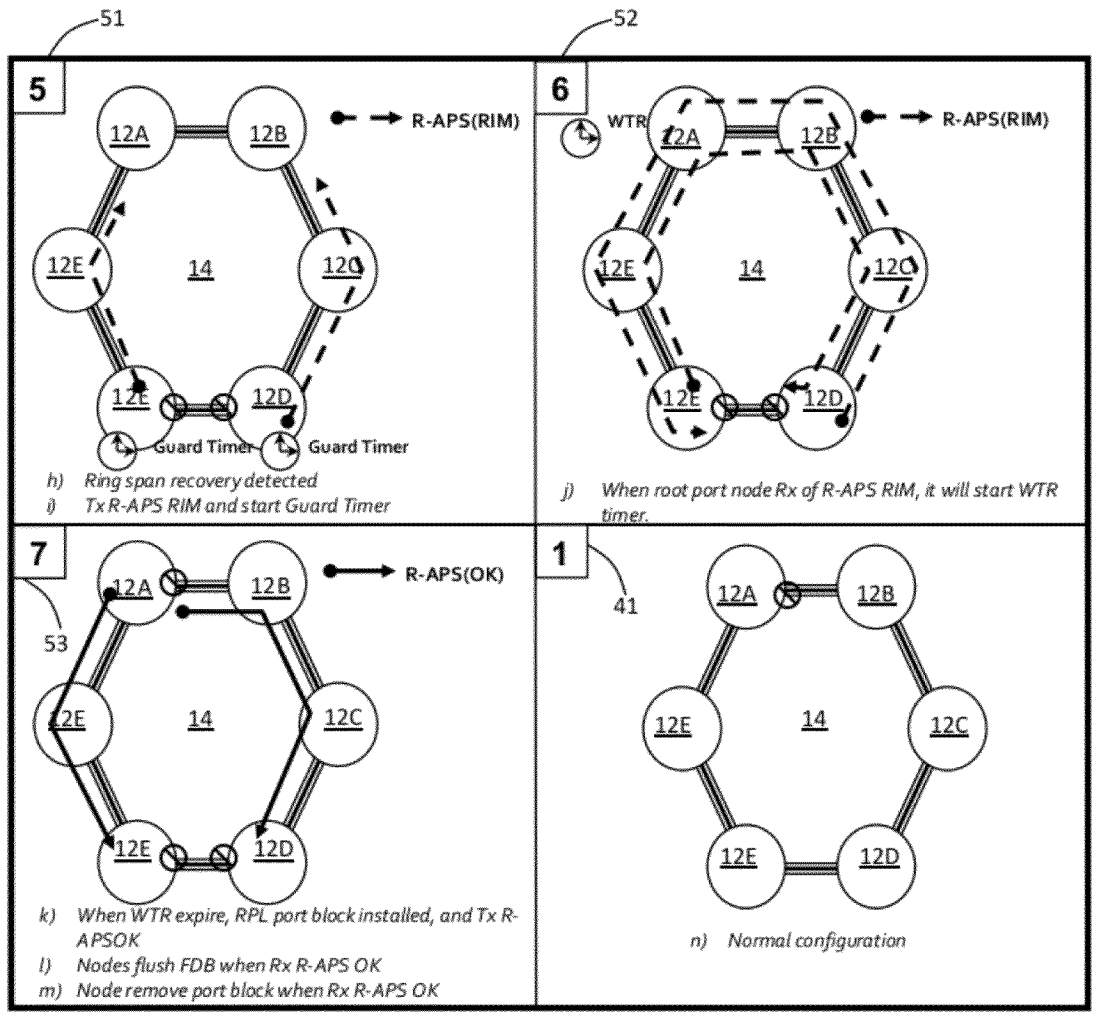
FIG. 5 is a sequence of network diagrams of the ring showing a recovery sequence using G.8032 Ethernet Ring Protection on the network elements.

Referring to FIG. 5, in an exemplary embodiment, the ring 14 is illustrated showing a recovery sequence using G.8032 Ethernet Ring Protection on the network elements 12. The recovery sequence includes a recovery from the failure illustrated in FIG. 4 between the network elements 12D, 12E. At a point 51, a ring span recovery is detected between the network elements 12D, 12E and R-APS Recovery Indication Messages (RIM) are transmitted along with guard timers started at the network elements 12D, 12E. At a point 52, when a root port node receives the R-APS RIM, a wait-to-restore (WTR) timer is started. At a point 53, when the WTR expires, the RPL port block is installed at the network element 12A and R-APS OK messages are transmitted. Also, each of the network elements 12 flush their FDB when the R-APS OK messages are received as well as removing port block such as at the network elements 12D, 12E when the R-APS OK messages are received.

Figure 6:
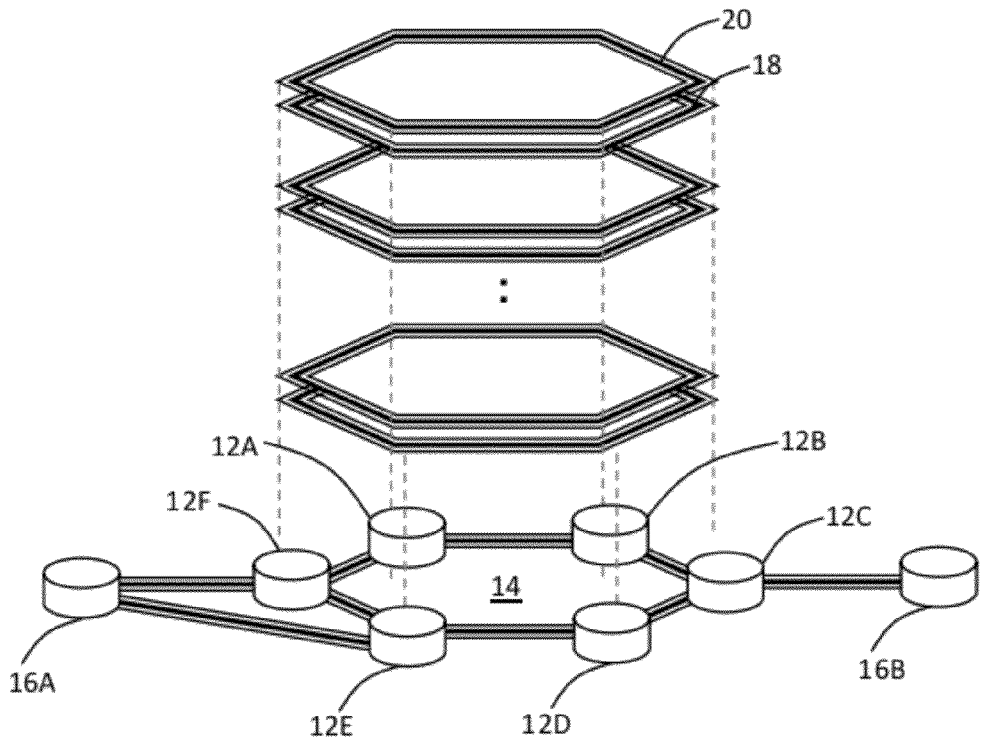
FIG. 6 is a network diagram of plural VRings with each VRing including a separate Ring Automated Protection Switching (R-APS) channel.
Figure 7:
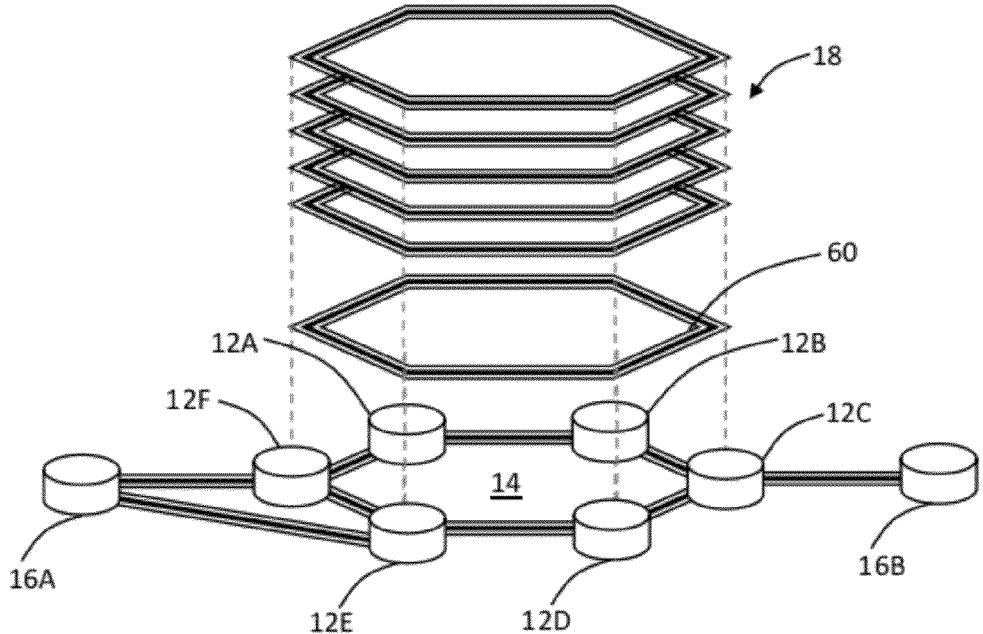
FIG. 7 is a network diagram of plural VRings with each VRing sharing a common R-APS channel.

Referring to FIGS. 6 and 7, in an exemplary embodiment, the network 10 is illustrated with plural VRings 22 each with separate R-APS channels 18 (FIG. 6) and with a combined R-APS channel 60 (FIG. 7). FIG. 6 illustrates typical G.8032 operation where each of the data channels 20 has a corresponding R-APS channel 18. In this exemplary embodiment of FIG. 6, assume there are N VRings 22 such that VRing:Ring→N: 1, where N$\geq$1, the following associations apply to the Ring 14 of FIG. 6: Data Channel:VRing→1:1; R-APS Channel:VRing→1:1; and R-APS Channel:Ring→N:1, where N$\geq$1. Let $X_1$ represent $\{vid_{i1}, \ldots, vid_{j1}\}$ associated with $VRing_1$, and let $X_n$ represent $\{vid_{an}, \ldots, vid_{bn}\}$ associated with $VRing_n$, accordingly $(X_1 \not\subseteq X_n)$ and $(X_1 \cap X_n = \emptyset)$. In particular with G.8032, the channel block 24 location for the R-APS channel 18 and the service data channel 20 associated with a given VRing 22 need not be co-located at the same network element 12. For example, channel blocks 24 on the service data channel 20 may be distributed across the ring 14 to support load distribution and ring traffic engineering. Traffic bandwidth utilization associated with the R-APS channel 18 is very low, especially when compared to service data 20 traffic bandwidth utilization. Channel loop prevention for the R-APS channel 18 is guaranteed by VID filters against ingress/egress ports, or the ring network element 12 sourcing the R-APS messages will be responsible for stripping the frame from the ring based upon R-APS SA (or R-APS Node Id), FIG. 7 illustrates the ring 14 with a single R-APS channel 60 for the plural VRings 22. The single R-APS channel 60 is a management channel that is shared by the plural VRings 22 while still operating according to the Ethernet Ring Protection protocol. In this exemplary embodiment of FIG. 7, assume there are N VRings 22 such that VRing:Ring→N: 1, where N$\geq$1: the following associations apply to the Ring 14 of FIG. 7: Data Channel:VRing→1:1, R-APS Channel:Ring→1:1. Let $X_1$ represent $\{vid_{i1}, \ldots, vid_{j1}\}$ associated with $VRing_1$, let $X_n$ represent $\{vid_{an}, \ldots, vid_{bn}\}$ associated with $VRing_n$, and let Y represent $\{vid_y\}$ associated with the ring 14, accordingly the ring 14 of FIG. 7 exhibits the following characteristics $\Rightarrow (X_1 \not\subseteq X_n)$ and $(X_1 \cap X_n = \emptyset)$ and $(Y \not\subseteq X_1)$ and $(Y \not\subseteq X_n)$. Each of the VRings 22 has its own service data channel 20 which share the single R-APS channel 60 that manages/controls all VRings 22 associated with ring 14. In particular, the network elements 12 that have a R-APS channel block active (i.e., installed) will be responsible for transmitting the R-APS messages for all of the VRings 22, and message summarization techniques may be applied. VRing 22 service data channel 20 blocks 24 are distributed across the ring as needed. Network elements 12 that own a VRing 22 service data channel 20 block 24 include "VRing instance" information into the R-APS OK messages that are in transit. R-APS FIM/RIM messages contain information associated with all "VRing instances." Accordingly, network elements 12 (associated with a VRing 22) will only process R-APS messages that are in transit, if it contains "VRing instance" information that it is configured with.

Figure 8:
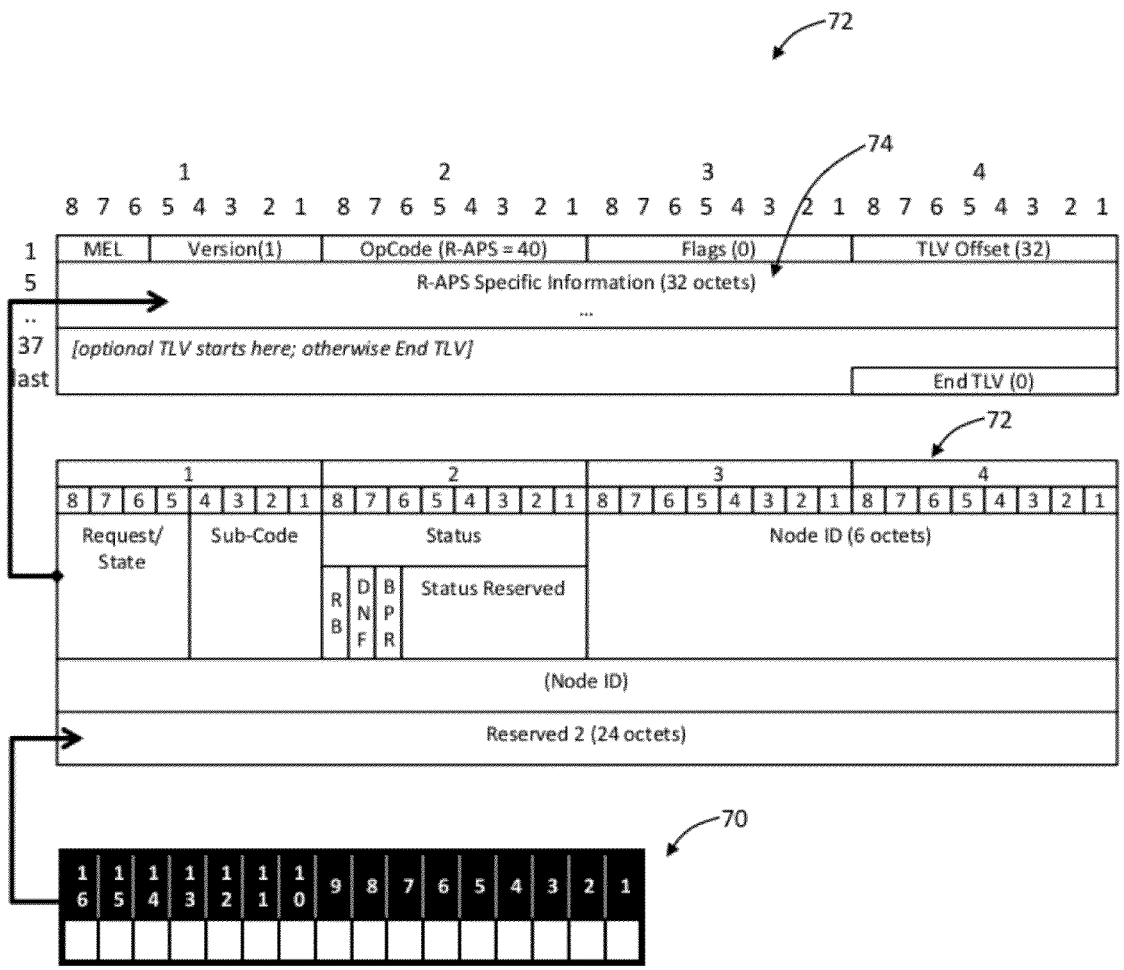
FIG. 8 is a block diagram of a VRing instance indicator within an Ethernet Operations, Administration, and Maintenance (OAM) Protocol Data Unit (PDU) message.

Referring to FIG. 8, in an exemplary embodiment, a VRing instance indicator 70 is illustrated within an Ethernet OAM PDU message 72. The messages 72 are used for Ethernet Operations Administration and Maintenance (OAM) and are defined in IEEE 802.1ag "Connectivity Fault Management" (September 2007). For example, the messages 72 may be utilized for fault detection. Also, the messages 72 include R-APS specific information 74. In an exemplary embodiment, the VRing instance indicator 70 may be included in the R-APS specific information 74 as a bit vector in the reserved section of the R-APS specific information 74. Thus, every R-APS message for the single R-APS channel 60 includes this VRing instance indicator 70 such that the different VRings 22 may be able to share the same R-APS channel 60. That is, the VRing instance indicator 70 provides a mechanism to differentiate between the different VRings 22 on the same R-APS channel 60. Specifically, the network elements 12 that receive the message 72 will take action upon the R-APS specific information 74 only if there is a VRing instance at that network element 12 based on the VRing instance indicator 70.

Figure 9:
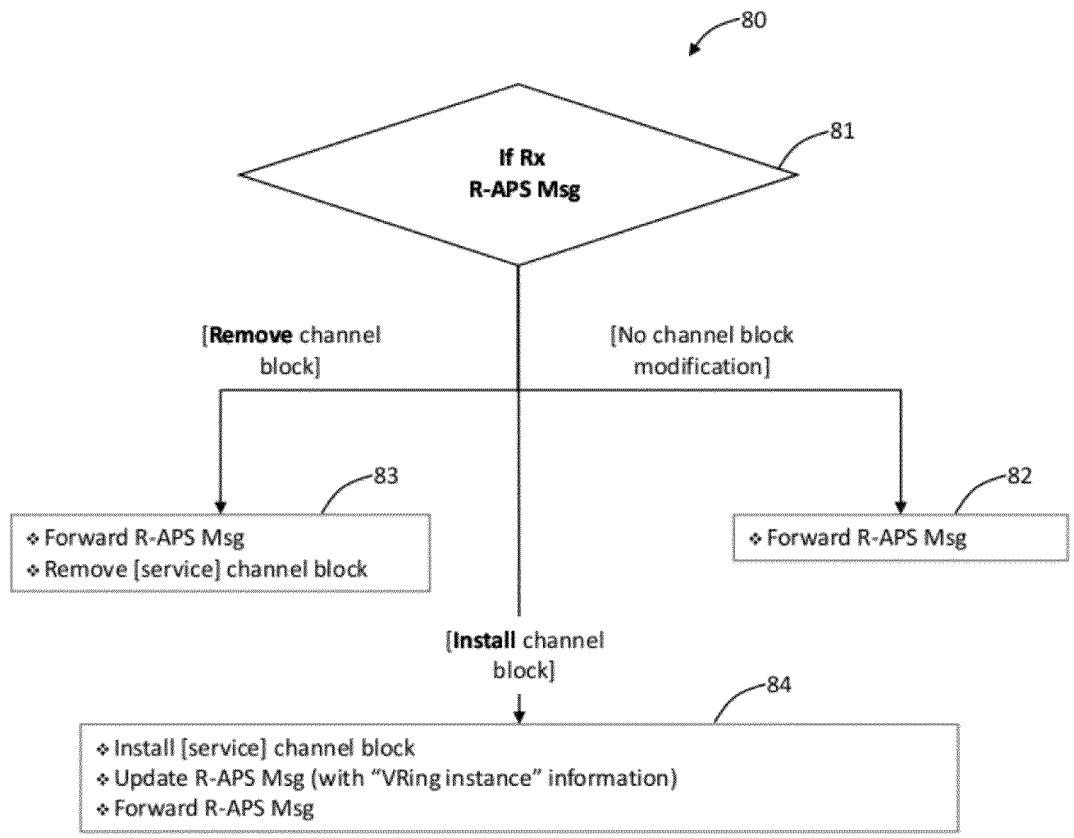
FIG. 9 is a flowchart of a network element G.8032 processing method for utilizing the VRing instance indicator with R-APS messages.

Referring to FIG. 9, in an exemplary embodiment, a flowchart of a network element G.8032 processing method 80 for utilizing the VRing instance indicator 70 with R-APS messages. The processing method 80 may be implemented as part of a larger G.8032 engine which implements the various functions for G.8032 protection as described herein. In particular, the processing method 80 is implemented by one of the network elements 12. Upon receiving a R-APS message (step 81), the processing method 80 requires a network element 12 to implement various functions based thereon. Note, the network element 12 is configured to read the VRing instance indicator 70 in the message 72. The network element 12 is configured to process R-APS messages based thereon, i.e. if there is no instance at that network element 12 or if there is no required action such as a channel block modification, the network element forwards that R-APS message (step 82). The R-APS message may require the network element 12 to remove an existing channel block, such as in the case of a R-APS FIM message (step 83). Here, the network element 12 removes its channel blocks and forwards the R-APS message. Also, the R-APS message could require the network element 12 to install a channel block (step 84), such as based on an R-APS OK message. Here, the network element 12 will install a channel block, update the R-APS message with appropriate VRing instance indicators 70 and forward the updated R-APS message.

Figure 10:
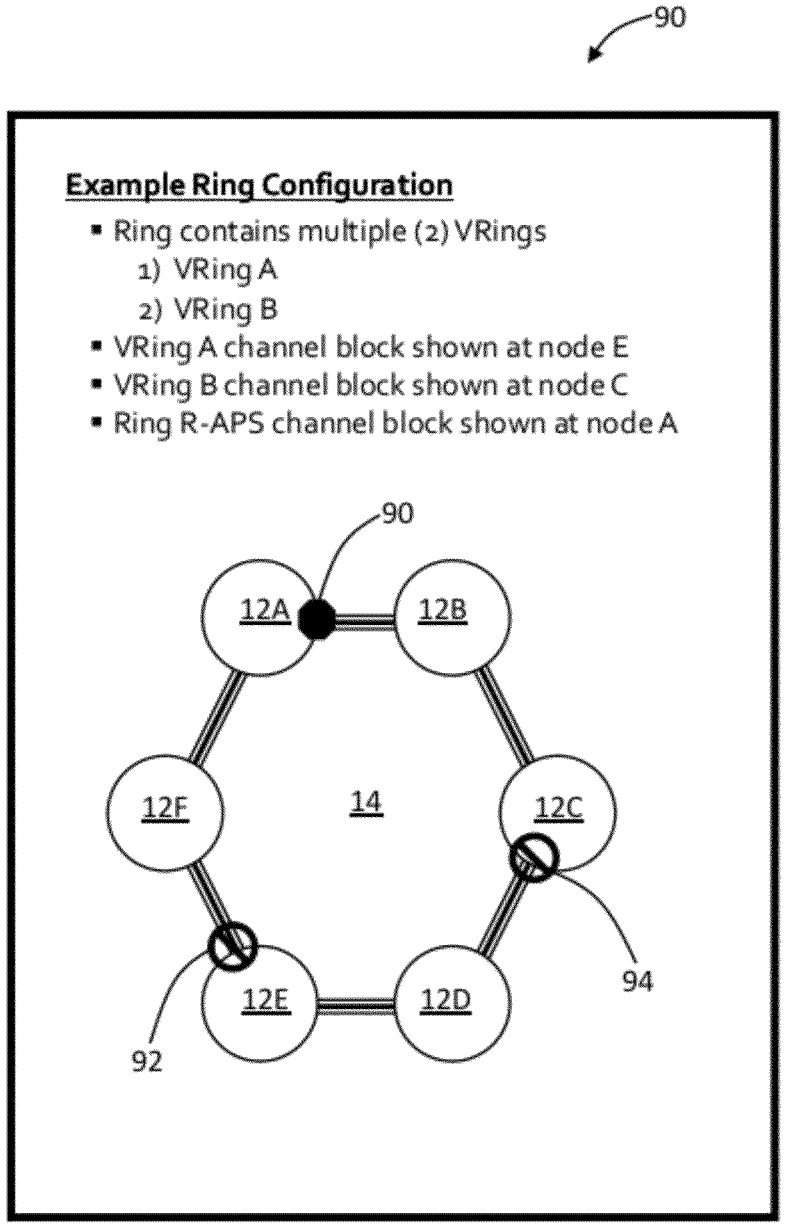
FIGS. 10-19 are a sequence of network diagrams of a ring illustrating an exemplary operation of a single R-APS channel with two VRings.
Figure 11:
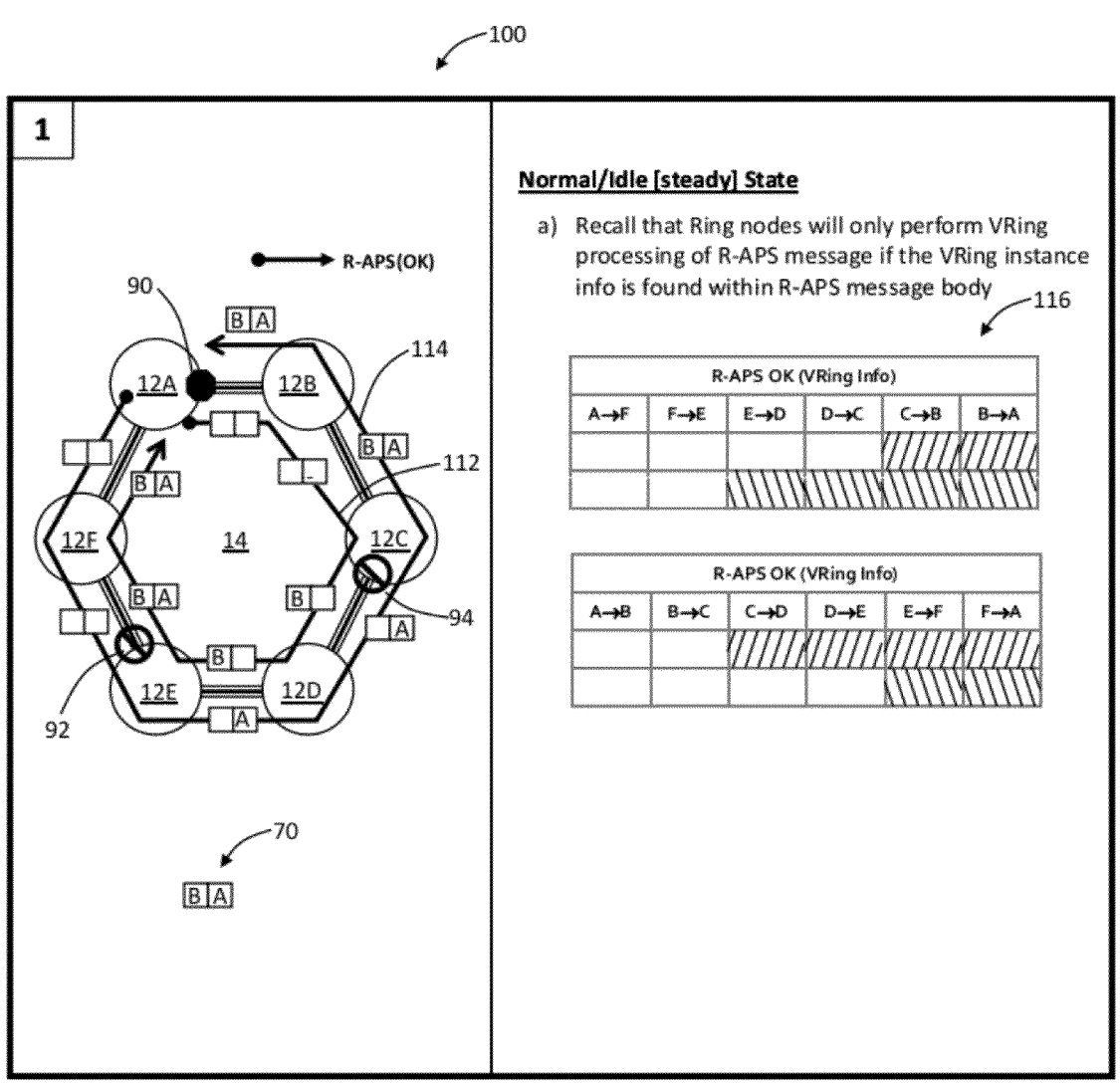

Referring to FIGS. 10-19, in an exemplary embodiment, a sequence of network diagrams of the ring 14 illustrate an exemplary operation of the single R-APS channel 60 with two VRings 22 (referred to in FIGS. 10-19 as VRing A and VRing B). In this exemplary embodiment, a R-APS channel block 90 is provisioned at the network element 12A, a VRing A channel block 92 is provisioned at the network element 12E, and a VRing B channel block 94 is provisioned at the network element 12C. Note, the VRings A and B 22 share the same R-APS channel 60, and the channel blocks 90, 92, 94 are at different locations for the R-APS channel 60 and the VRing data channels. FIG. 10 illustrates initial provisioning 90 of the ring 14. The FIGS. 11-19 illustrate various steps 100-108 showing operation under various conditions of the ring 14. At a first step 100 illustrated in FIG. 11, the ring 14 is operating in a normal or idle (steady) state, i.e. normal operating conditions. As the R-APS channel block 90 is provisioned at the network element 12A, the network element 12A generates R-APS messages that traverse the ring 14. That is, the network element 12A generates R-APS OK messages 112 clockwise to the network element 12B and R-APS OK messages 114 counterclockwise to the network element 12E. The VRing instance indicator 70 is included in FIGS. 11-19 denoting "A" for the VRing A and "B" for the VRing B. Note, the VRing instance indicator 70 takes into account the channel blocks 92, 94. That is, for the VRing A, the network element 12E is the demarcation point for R-APS messages with the VRing instance indicator 70 showing "A." For the VRing B, the network element 12C is the demarcation point for R-APS messages with the VRing instance indicator 70 showing "B." As described herein, the ring network elements 12 will only perform VRing processing of the R-APS messages if the VRing instance 70 info is found within R-APS message body. Also, tables 116 illustrate the VRing instance 70 traversing the ring 14.

Figure 12:
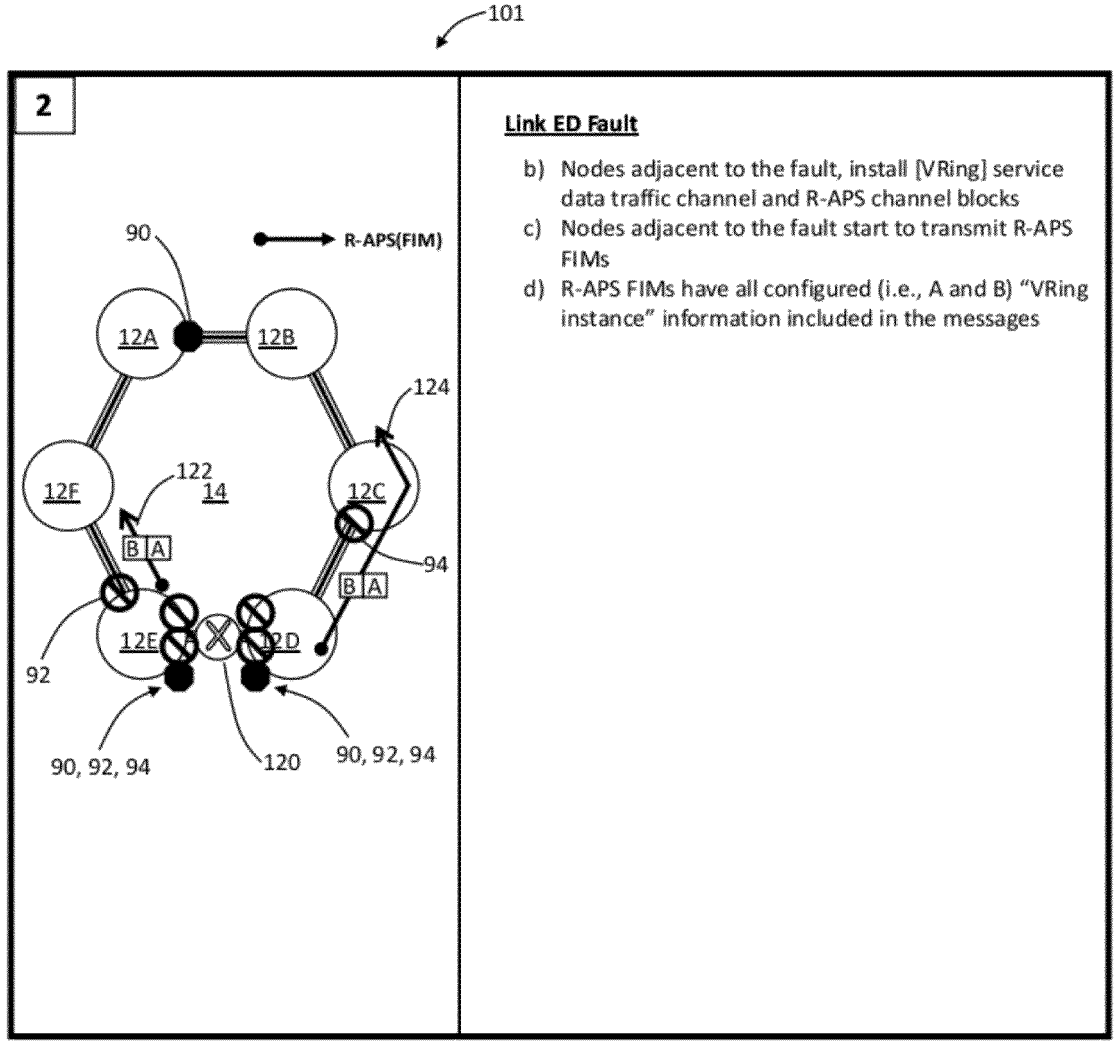
Figure 13:
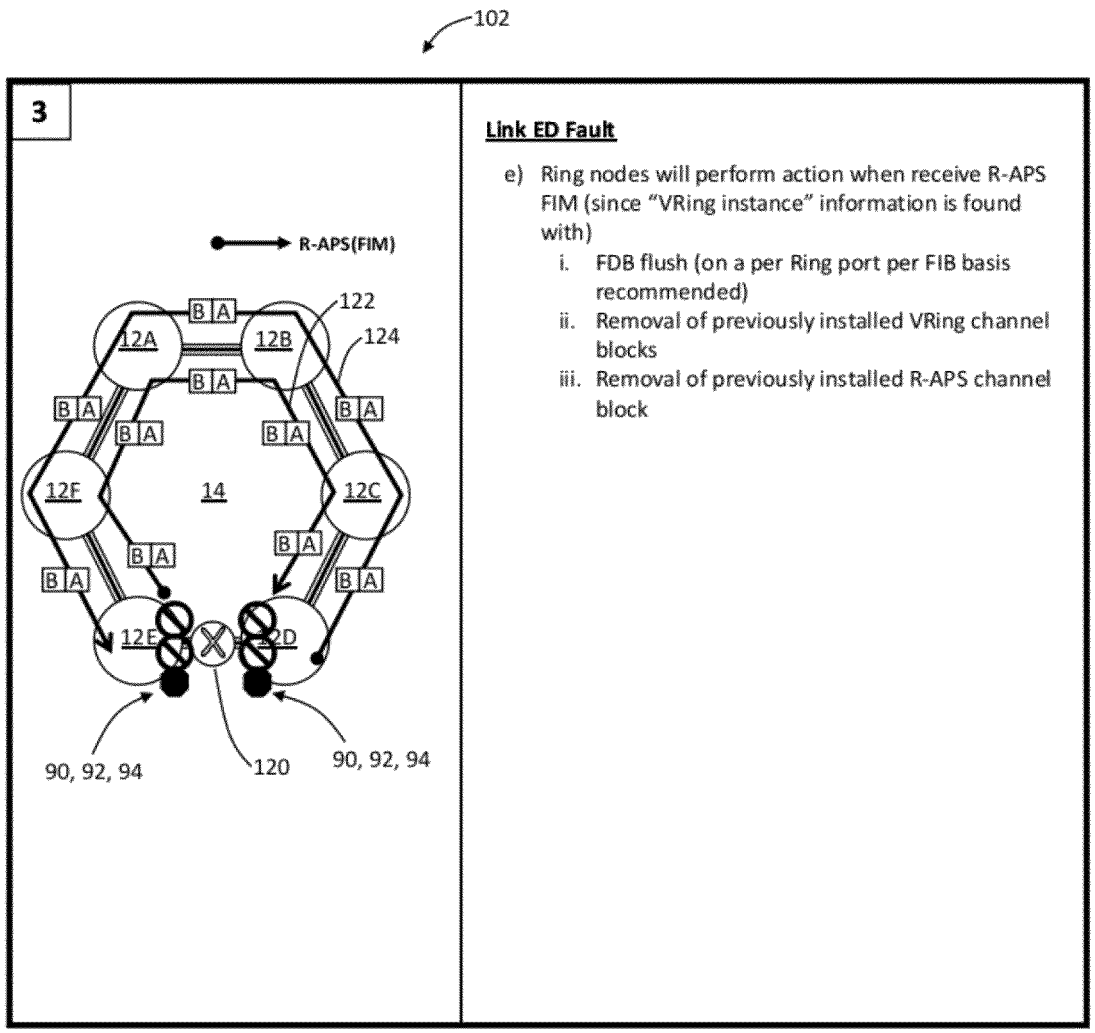

At a step 101 illustrated in FIG. 12, the ring 14 experiences a fault 120 between the network elements 12D and 12E. Subsequent to the fault 120, the network elements 12D, 12E install the service channel blocks 92, 94 and the R-APS channel block 90 on the faulted segment. The network elements 12D, 12E transmit R-APS FIM messages 122, 124 to all of the network elements 12, and the R-APS FIM messages 122, 124 include the VRing instance 70 with both VRings A and B included in the instance. At a step 102 illustrated in FIG. 13, all of the network elements 12 receive the R-APS FIM messages 122, 124 and each of the network elements 12 will perform actions since the R-APS FIM messages 122, 124 include VRing instance 70 for both of the VRings. In particular, each of the network elements 12 perform a FDB flush such as on a per ring port per Forwarding Information Base (FIB) basis. The network elements 12 remove any previous installed VRing channel blocks, i.e. the network elements 12C and 12E remove the channel blocks 92, 94 on their ports. The network elements 12 also remove any previously installed R-APS channel blocks, i.e. the network element 12A removes the channel block 90.

Figure 14:
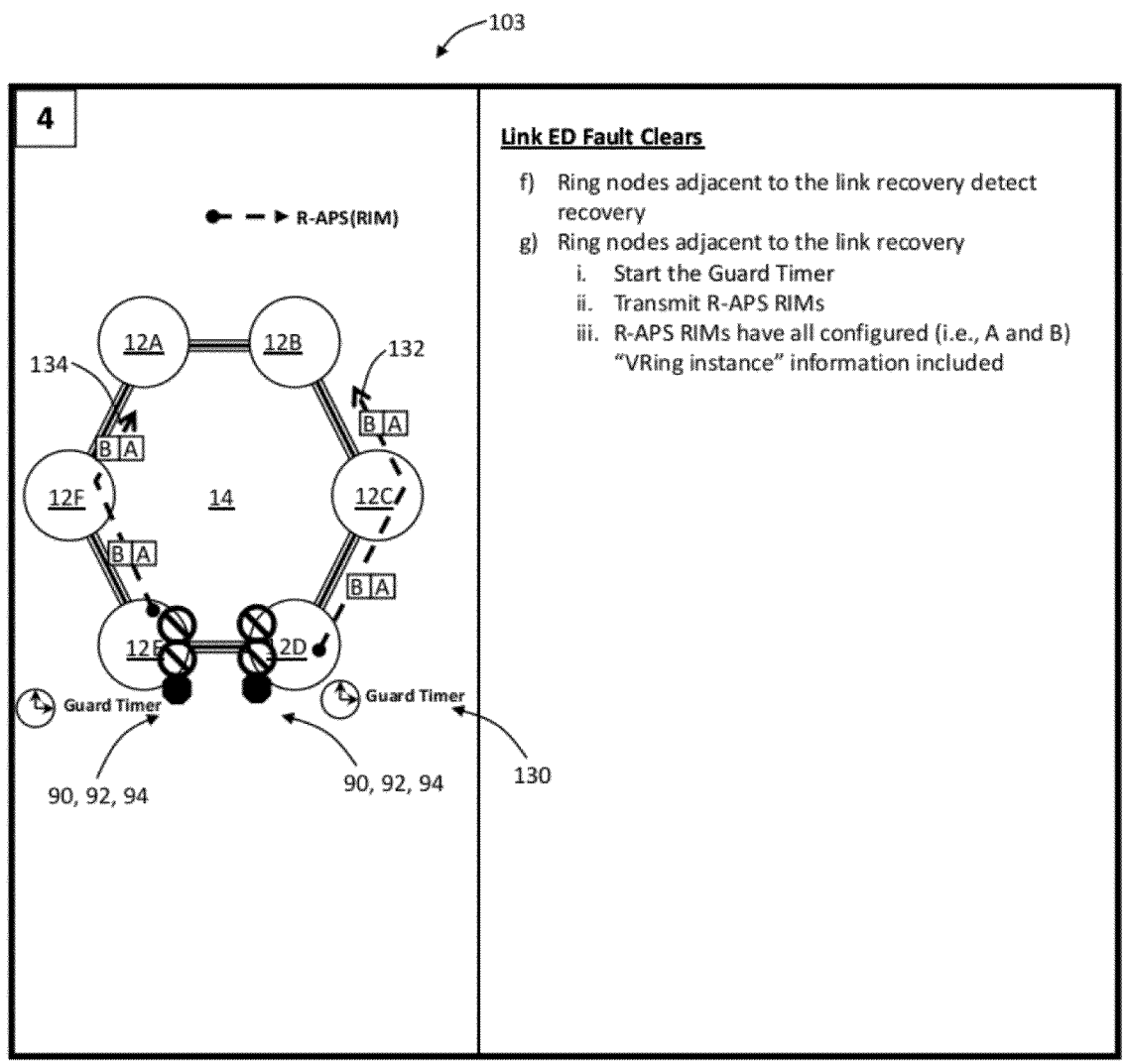
Figure 15:
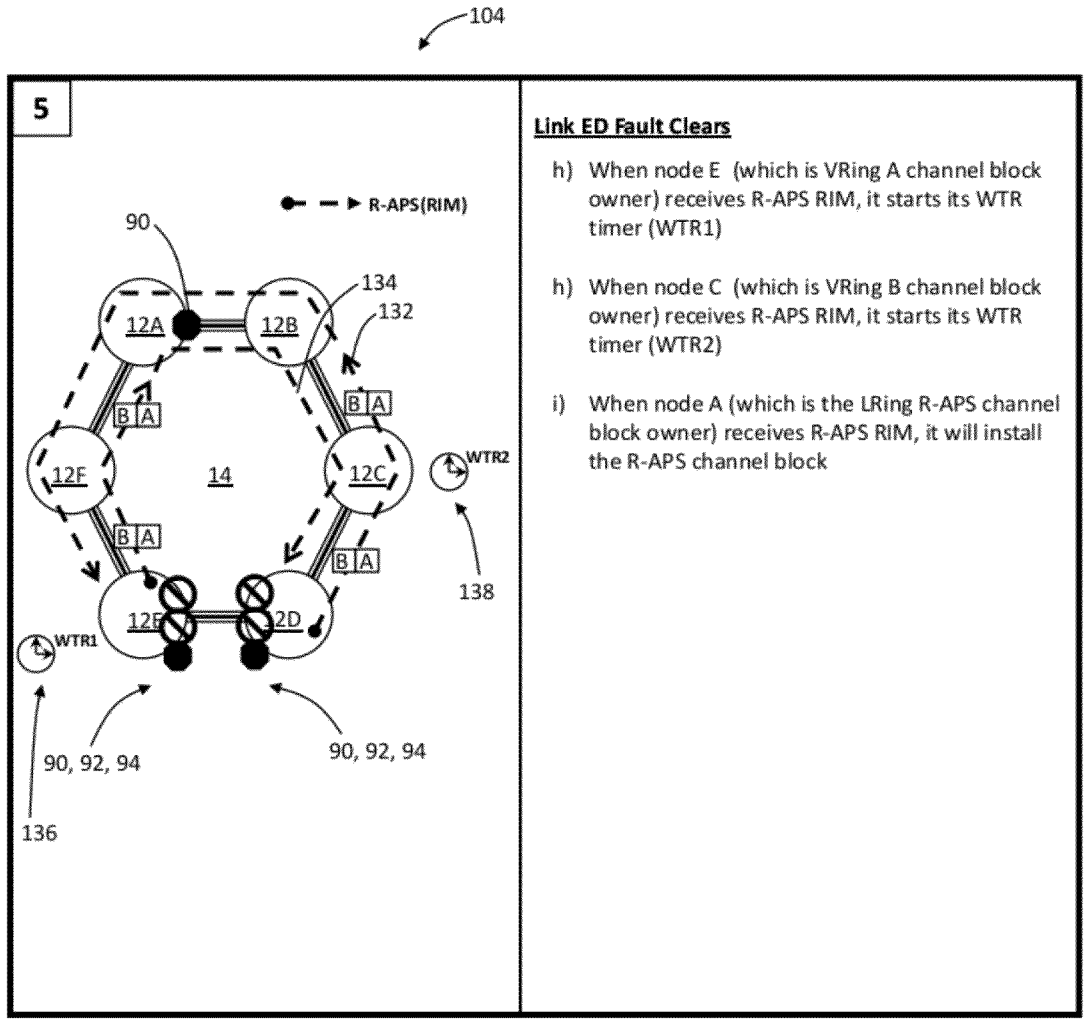

At a step 103 illustrated in FIG. 14, the fault 120 is removed between the network elements 12D and 12E. Note, the channel blocks 90, 92, 94 are still in place at the network elements 12D and 12E. Upon the network elements 12D, 12E detecting the link recovery, the network elements 12D, 12E each start a guard time 130 and transmit R-APS RIM messages 132, 134. Similar to the R-APS FIM messages 122, 124, the R-APS RIM messages 132, 134 include the VRing instance 70 for both of the VRings. At a step 104 illustrated in FIG. 15, the guard timers 130 have expired clearing the fault 120 and each of the network elements 12 have received the R-APS RIM messages 132, 134. When the network element 12E (which is the VRing A channel block 92 owner) receives the R-APS RIM messages 132, 134, the network element 12E starts a Wait-to-Restore (WTR1) timer 136. When the network element 12C (which is the VRing B channel block 94 owner) receives the R-APS RIM messages 132, 134, the network element 12C starts a Wait-to-Restore (WTR2) timer 138. When the network element 12A (which is the logical ring R-APS channel block 90 owner) receives the R-APS RIM messages 132, 134, the network element 12A installs the channel block 90.

Figure 16:
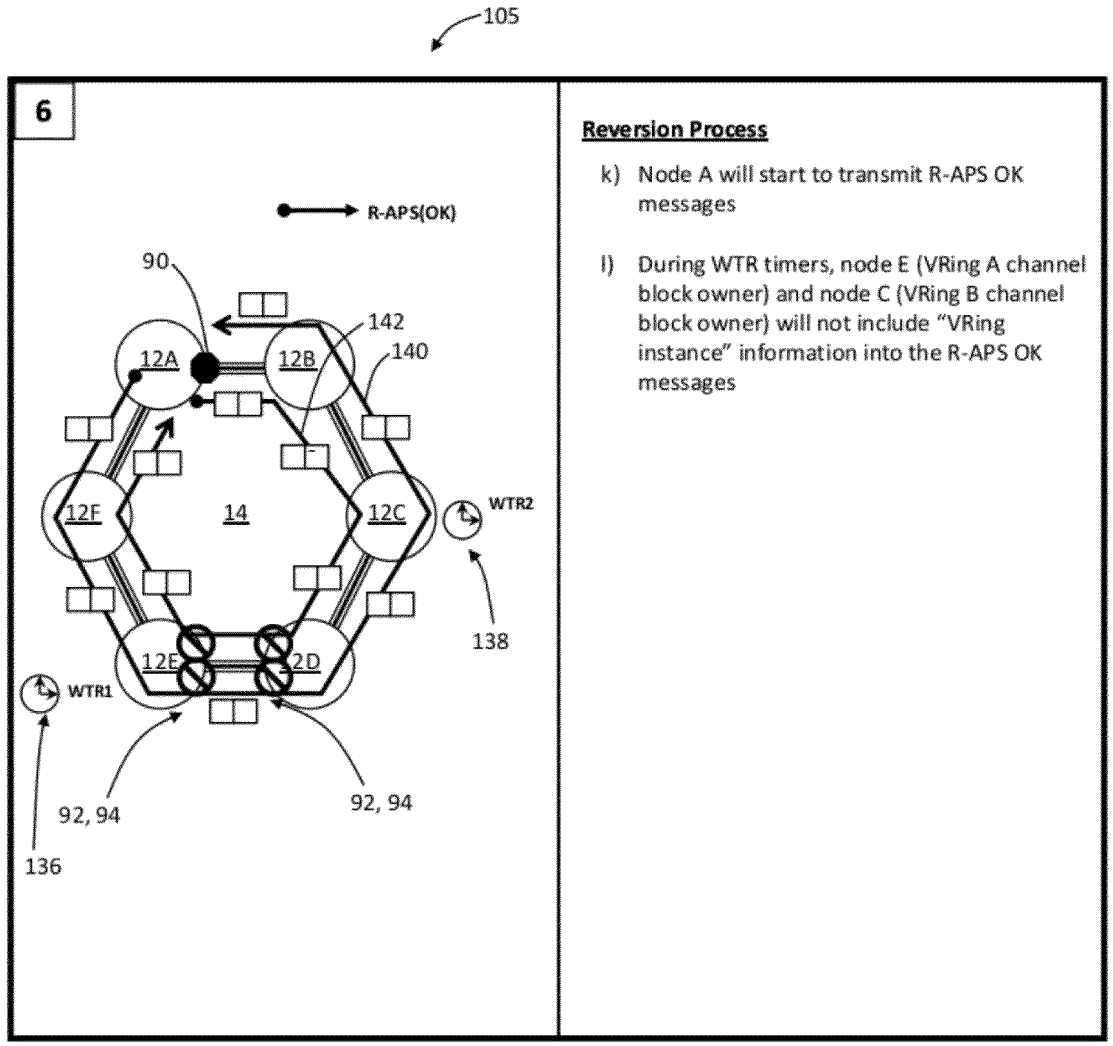
Figure 17:
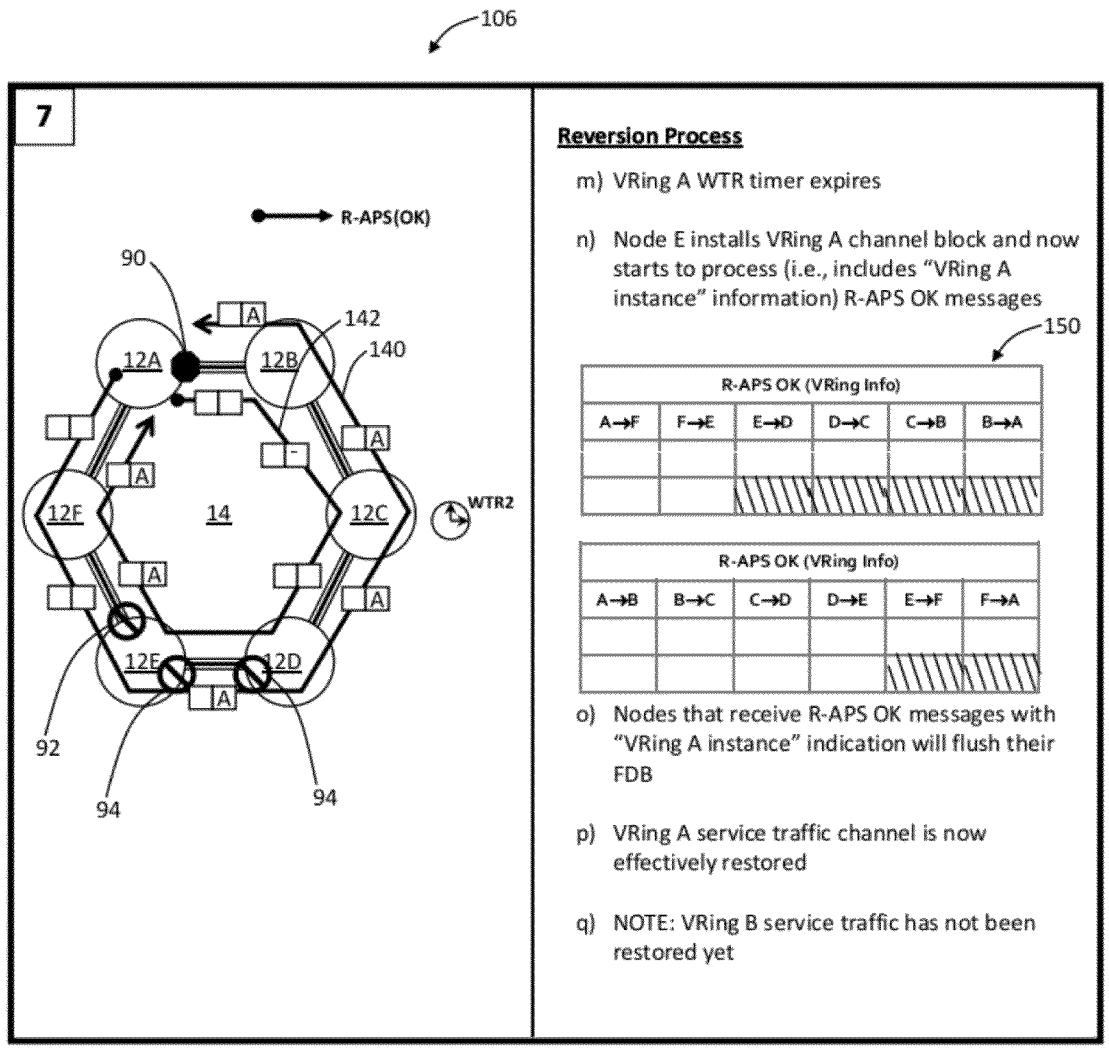

At a step 105 illustrated in FIG. 16, a reversion process begins with the network element 12A transmitting R-APS OK messages 140, 142. The WTR timers 136, 138 are still active, and the network elements 12E, 12C will not include VRing instance 70 information in the R-APS OK messages 140, 142. At a step 106 illustrated in FIG. 17, the reversion process continues with the WTR timer 136 expiring (note, the WTR timer 138 is still active for illustration purposes). Upon expiry of the WTR timer 136, the network element 12E installs the channel block 92 and the network element 12E starts to process the R-APS OK messages 140, 142 including VRing A instance information in the VRing instance 70 of the R-APS OK messages 140, 142 (shown also in tables 150). The network elements 12 that receive the R-APS OK messages 140, 142 with the VRing A instance information in the VRing instance 70 will flush their FDB (with respect to the VRing A). Also, the network elements 12E, 12D will remove their channel blocks 92 for the VRing A. Now, the VRing A service traffic channel is effectively restored (VRing B service traffic has not yet been restored).

Figure 18:
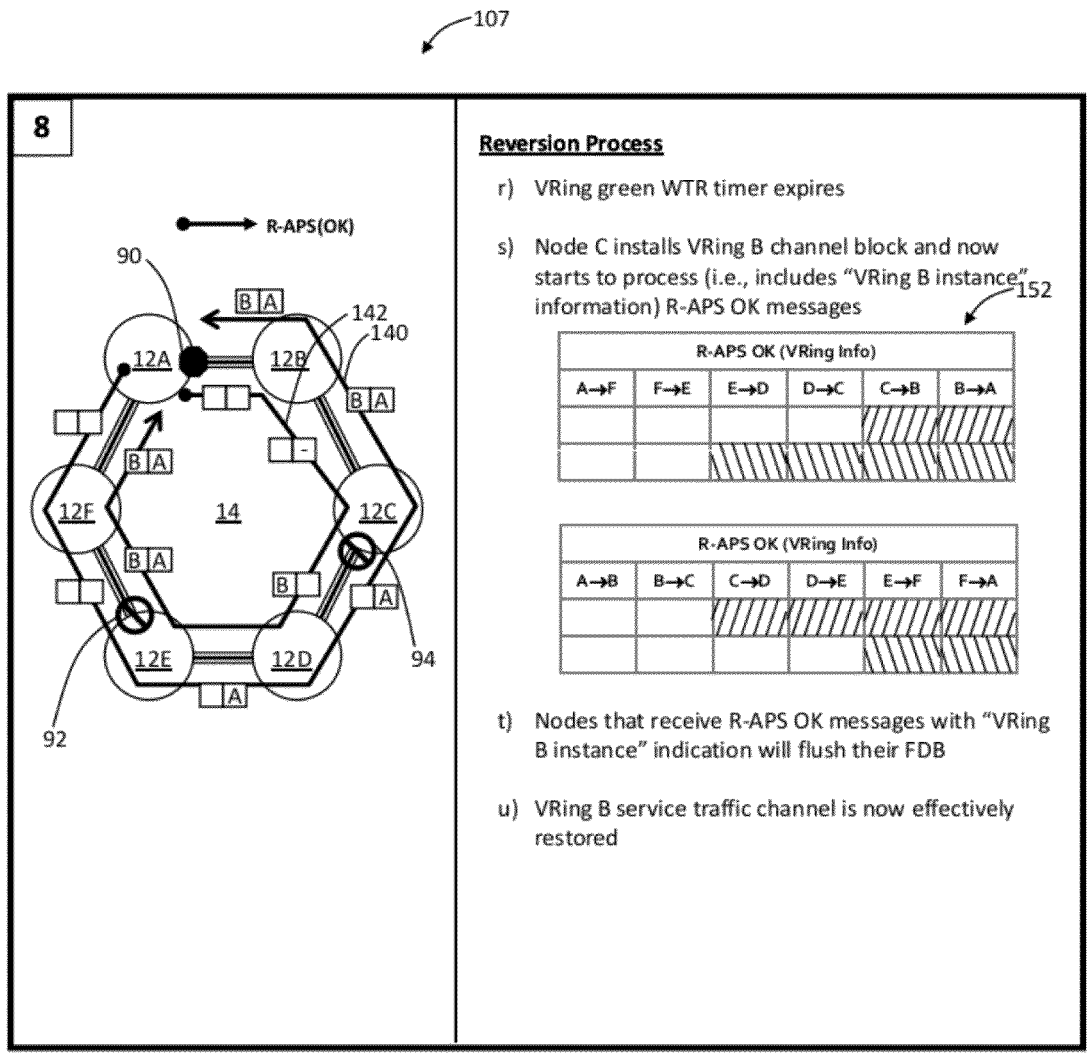
Figure 19:
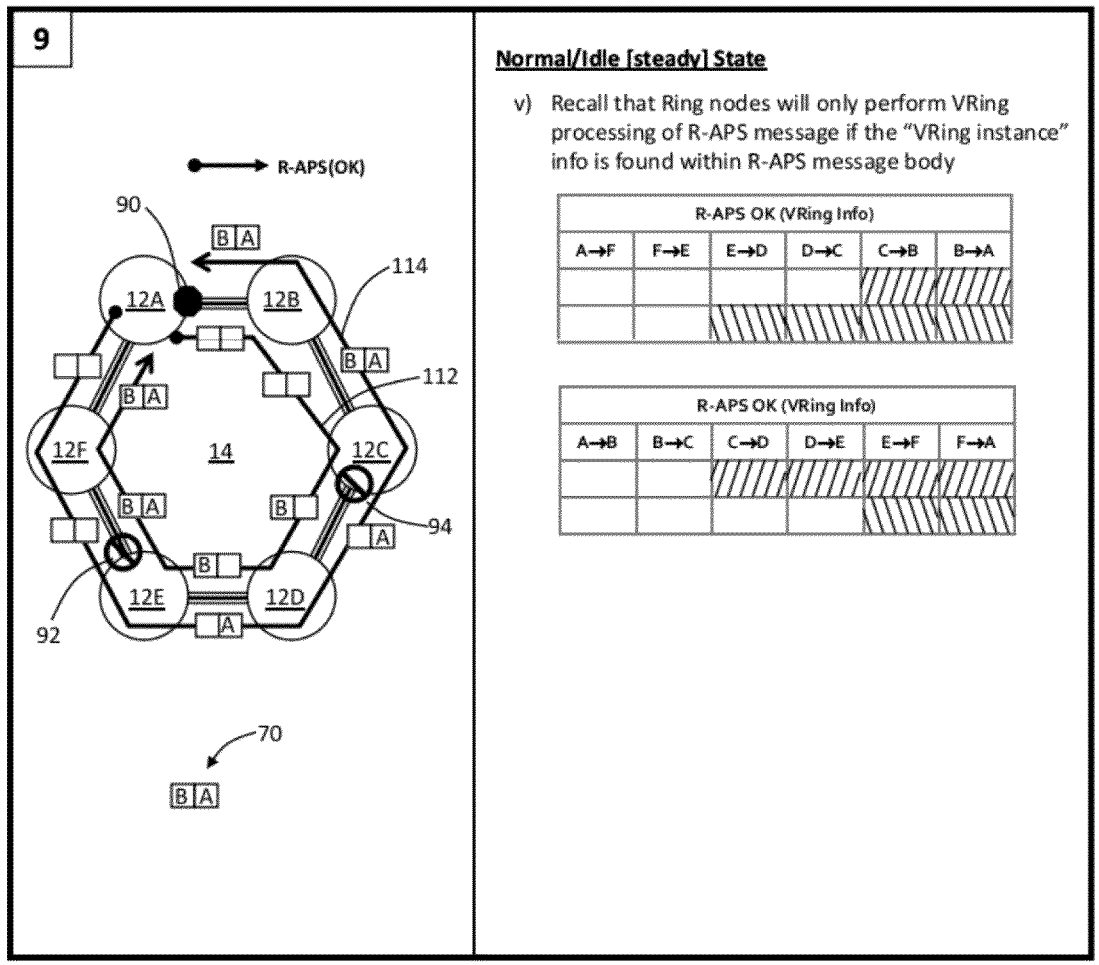

At a step 107 illustrated in FIG. 18, the reversion process continues with the expiration of the WTR timer 138. Upon expiry of the WTR timer 138, the network element 12C installs the VRing B channel block 94 and starts to process the R-APS OK messages 140, 142 including VRing B instance information in the VRing instance 70 of the R-APS OK messages 140, 142 (shown also in tables 152). The network elements 12 that receive the R-APS OK messages 140, 142 with the VRing B instance information in the VRing instance 70 will flush their FDB (with respect to the VRing B). Also, the network elements 12E, 12D will remove their channel blocks 94 for the VRing B. Now, the VRing B service traffic channel is effectively restored. Finally at a step 108 illustrated in FIG. 19, the ring 14 is back in the normal or idle (steady) state operation described above in FIG. 11 at step 100.

Figure 20:
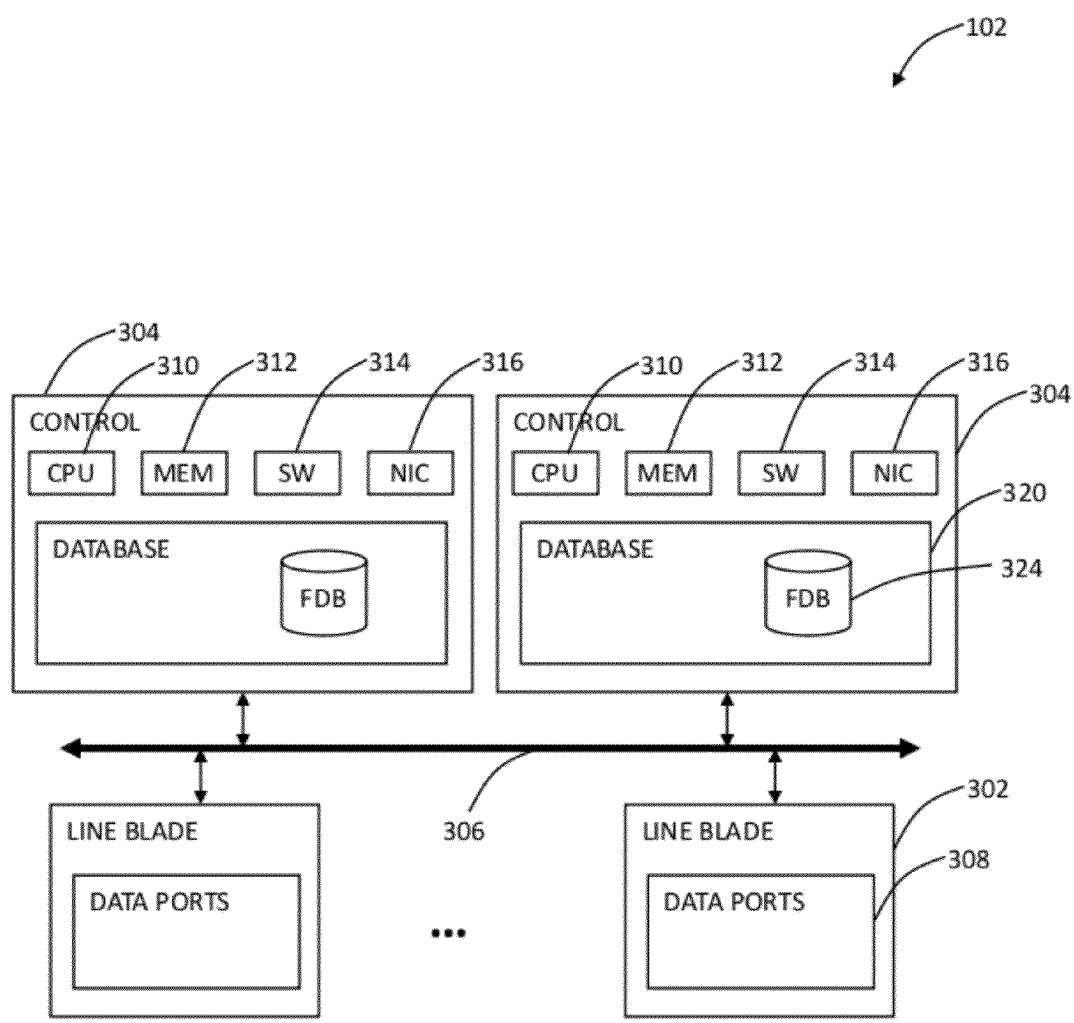
FIG. 20 is a block diagram of an exemplary network element configured to implement sharing of a single R-APS channel with multiple VRings.

Referring to FIG. 20, in an exemplary embodiment, a block diagram illustrates an exemplary implementation of the network element 12. In this exemplary embodiment, the network element 12 is an Ethernet network switch, but those of ordinary skill in the art will recognize the present invention contemplates other types of network elements and other implementations, such as, for example, a layer two switch integrated within an optical network element. In this exemplary embodiment, the network element 12 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 12. In another exemplary embodiment, the functionality of each of the blades 302, 304 may be integrated within a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 102 out by the correct port 308 to the next network element. "Switching fabric" includes switching units, or individual boxes, in a node; integrated circuits contained in the switching units; and programming that allows switching paths to be controlled.

Within the context of the present invention, the control blades 304 include a microprocessor 310, memory 312, software 314, and a network interface 316 to operate within the network management system 100. Specifically, the microprocessor 310, the memory 312, and the software 314 may collectively control, configure, provision, monitor, etc. the network element 102. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the network element 12 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 12. In an exemplary embodiment, the blades 302, 304 are configured to implement a G.8032 ring, such as the ring 14, and to implement the various processes, algorithms, methods, mechanisms, etc. described herein for implementing a plurality of VRings 22 using the single R-APS channel 60 with the VRing instance indicator 70 in R-APS messages over the R-APS channel 60.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network, comprising:
a plurality of interconnect network elements operating in a ring;
N virtual rings over the ring, N greater than or equal to one, each of the N rings operating Ethernet Ring Protection thereon;
a single management channel over the ring, wherein the single management channel configured to provide messages for the Ethernet Ring Protection on the N virtual rings, and wherein the single management channel comprises a Ring Automated Protection Switching (R-APS) channel; and
a virtual ring instance indicator disposed within messages over the R-APS channel, wherein the virtual ring instance indicator denotes which of the N virtual rings is associated with the messages.

2. The network of claim 1, wherein the virtual ring instance indicator is located within an Ethernet Operations, Administration, and Maintenance (OAM) Protocol Data Unit (PDU) message over the R-APS channel.

3. The network of claim 2, wherein the virtual ring instance indicator is disposed within a reserved section of R-APS specific information in the Ethernet OAM PDU message over the R-APS channel.

4. The network of claim 1, wherein, upon reception of a message over the R-APS channel, each of the plurality of interconnect network elements is configured to process the message based on the virtual ring instance indicator.

5. The network of claim 1, further comprising:
N service data channel blocks with each of the N service channel blocks associated with one of the N virtual rings and with each of the N service channel blocks at one of the plurality of interconnect network elements; and
a management channel block at one of the plurality of interconnect network elements;
wherein each of plurality of interconnect network elements with one of the N service channel blocks is configured to include virtual ring instance indicator information in messages on the single management channel.

6. The network of claim 5, wherein at least one of the N service channel blocks is at a different network element from the management channel block.

7. The network of claim 5, wherein, under normal operating conditions, the network element comprising the management channel block is configured to source messages on the single management channel, and the network elements with the N service data channel blocks are configured to include the virtual ring instance indicator information in the sourced messages.

8. The network of claim 5, wherein, under a fault condition between two of the network elements, the two of the network elements are configured to:
- install the N service channel blocks and the management channel block adjacent to the fault condition; and
- transmit fault indication messages on the single management channel.

9. The network of claim 8, wherein each of the network elements is configured to, upon receipt of the fault indication messages:
- flush a forwarding database;
- remove any previously installed of the N service data channel blocks; and
- remove any previously installed of the management channel block.

10. The network of claim 9, wherein, upon recovery of the fault condition between two of the network elements, the two of the network elements are configured to:
- implement a guard timer; and
- transmit recovery indication messages on the single management channel.

11. The network of claim 10, wherein the fault indication messages and the recovery indication messages comprise the virtual ring instance indicator information for each of the N virtual rings.

12. The network of claim 10, wherein, upon receipt of the recovery indication messages, each of the network elements is configured to:
- implement a wait to restore timer; and
- reinstall the N service data channel blocks and the management channel block as previously configured prior to the fault condition at expiry of the wait to restore timer.

13. The network of claim 1, wherein each of the ring and the plurality of virtual rings have no Virtual Local Area Network Identifications (VLAN IDs) in common.

14. A network element system, comprising:
- two or more Ethernet ports configured in a physical ring with a plurality of other network elements;
- a forwarding database for the two or more Ethernet ports;
- a controller communicatively coupled to the two or more Ethernet ports and the forwarding database;
- N virtual rings operating Ethernet Ring Protection on the two or more Ethernet ports, N greater than or equal to one;
- a single Ring Automated Protection Switching (R-APS) channel on the two or more Ethernet ports, the single R-APS channel being shared by each of the N virtual rings;
- N service data channel blocks with each of the N service channel blocks associated with one of the N virtual rings and with each of the N service channel blocks at one of a plurality of interconnect network elements; and
- a management channel block at one of the plurality of interconnect network elements;
- wherein each of plurality of interconnect network elements with one of the N service channel blocks is configured to include virtual ring instance indicator information in messages on a single management channel.

15. The network element system of claim 14, further comprising:
- an algorithm associated with the R-APS channel to differentiate messages on the R-APS channel based on the N virtual rings.

16. A method, comprising:
- operating a plurality of network elements in a physical ring;
- provisioning one or more virtual rings on the physical ring with the one or more virtual rings utilizing Ethernet Ring Protection;
- provisioning a single management channel on the physical ring, the single management channel comprising an algorithm to differentiate messages based on the one or more virtual rings;
- installing a service data channel block for each of the one or more virtual rings at one or more of the plurality of network elements;
- installing a management channel block for the single management channel at one of the plurality of network elements;
- at the network element with the management channel block, sourcing management messages on the single management channel; and
- at each of the plurality of network elements with service data channel blocks, updating based on the algorithm to differentiate management messages based on the one or more virtual rings.

17. The method of claim 16, further comprising:
- under a fault condition between two of the network elements, installing a service data channel block for each of the one or more virtual rings and the management channel block adjacent to the fault condition;
- transmitting fault indication messages on the single management channel with the algorithm configured such that each of the network elements processes the fault indication messages;
- upon reception of the fault indication messages on the single management channel, flushing a forwarding database and removing any previously installed service data channel blocks and the management channel block;
- upon recovery of the fault condition between two of the network elements, implementing a guard timer and transmitting recovery indication messages on the single management channel; and
- upon receipt of the recovery indication messages, implementing a wait to restore timer and reinstalling any previously installed service data channel blocks and the management channel block as previously configured prior to the fault condition at expiry of the wait to restore timer.

* * * * *